US012633298B2

(12) United States Patent
Baeckstroem et al.

(10) Patent No.: US 12,633,298 B2
(45) Date of Patent: *May 19, 2026

(54) APPARATUS FOR ENCODING A SPEECH SIGNAL EMPLOYING ACELP IN THE AUTOCORRELATION DOMAIN

(71) Applicant: Fraunhofer-Gesellschaft zur Foerderung der angewandten Forschung e.V., Munich (DE)

(72) Inventors: Tom Baeckstroem, Nuremberg (DE); Markus Multrus, Nuremberg (DE); Guillaume Fuchs, Bubenrath (DE); Christian Helmrich, Erlangen (DE); Martin Dietz, Nuremberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/680,606

(22) Filed: May 31, 2024

(65) Prior Publication Data

US 2024/0321284 A1 Sep. 26, 2024

Related U.S. Application Data

(63) Continuation of application No. 17/576,797, filed on Jan. 14, 2022, now Pat. No. 12,002,481, which is a (Continued)

(51) Int. Cl.
*G10L 19/00* (2013.01)
*G10L 13/00* (2006.01)
(Continued)

(52) U.S. Cl.
CPC .......... *G10L 19/038* (2013.01); *G10L 19/107* (2013.01); *G10L 2019/0001* (2013.01)

(58) Field of Classification Search
CPC ......... G10L 25/06; G10L 25/12; G10L 19/12; G10L 19/005; G10L 2019/0011; G10L 2019/0016; G10L 2019/0001
See application file for complete search history.

(56) References Cited

U.S. PATENT DOCUMENTS 4,815,135 A 3/1989 Taguchi
4,868,867 A 9/1989 Davidson et al.
(Continued)

FOREIGN PATENT DOCUMENTS

CN 101364854 B 1/2011
EP 0424016 A2 4/1991
(Continued)

OTHER PUBLICATIONS

Bäckström, Tom , "Vandermonde Factorization of Toeplitz Matrices and Applications in Filtering and Warping", IEEE Transactions on Signal Processing, vol. 61, No. 24, pp. 6257-6263, Sep. 2013.
(Continued)

*Primary Examiner* — Olujimi A Adesanya
(74) *Attorney, Agent, or Firm* — Perkins Coie LLP; Michael A. Glenn

(57) ABSTRACT

An apparatus for encoding a speech signal that determines a codebook vector of a speech coding algorithm includes a matrix determiner for determining an autocorrelation matrix R, and a codebook vector determiner for determining the codebook vector depending on the autocorrelation matrix R. The matrix determiner determines the autocorrelation matrix R by determining vector coefficients of a vector r, wherein the autocorrelation matrix R includes a plurality of rows and a plurality of columns, wherein the vector r indicates one of the columns or one of the rows of the autocorrelation matrix R, wherein R(i, j)=r(|i−j|), wherein R(i, j) indicates the coefficients of the autocorrelation matrix R, wherein i is a first index indicating one of a plurality of rows of the
(Continued)

autocorrelation matrix R, and wherein j is a second index indicating one of the plurality of columns of the autocorrelation matrix R.

20 Claims, 3 Drawing Sheets

Related U.S. Application Data continuation of application No. 16/209,610, filed on Dec. 4, 2018, now Pat. No. 11,264,043, which is a continuation of application No. 14/678,610, filed on Apr. 3, 2015, now Pat. No. 10,170,129, which is a continuation of application No. PCT/EP2013/066074, filed on Jul. 31, 2013.

(60) Provisional application No. 61/710,137, filed on Oct. 5, 2012.

(51) Int. Cl.

| | |
|---|---|
| ***G10L 19/038*** | (2013.01) |
| ***G10L 19/107*** | (2013.01) |
| ***G10L 21/00*** | (2013.01) |

(56) References Cited

U.S. PATENT DOCUMENTS

| | | | | |
|---|---|---|---|---|
| 4,910,781 | A | 3/1990 | Ketchum et al. | |
| 5,265,167 | A | 11/1993 | Akamine et al. | |
| 5,495,555 | A | 2/1996 | Swaminathan | |
| 5,583,963 | A | 12/1996 | Lozach | |
| 5,657,422 | A | 8/1997 | Janiszewski et al. | |
| 5,699,482 | A | 12/1997 | Adoul et al. | |
| 5,717,825 | A | 2/1998 | Lamblin | |
| 5,751,901 | A | 5/1998 | Dejaco et al. | |
| 5,794,182 | A * | 8/1998 | Manduchi | G10L 19/125 704/223 |
| 5,854,998 | A | 12/1998 | Flomen et al. | |
| 5,924,062 | A | 7/1999 | Maung | |
| 5,963,898 | A | 10/1999 | Navarro et al. | |
| 6,055,496 | A | 4/2000 | Heidari et al. | |
| 6,226,604 | B1 | 5/2001 | Ehara et al. | |
| 7,243,064 | B2 * | 7/2007 | Paris | G10L 19/04 704/219 |
| 7,873,064 | B1 | 1/2011 | Li et al. | |
| 8,036,887 | B2 | 10/2011 | Yasunaga et al. | |
| 8,560,329 | B2 | 10/2013 | Zhang et al. | |
| 9,280,982 | B1 | 3/2016 | Kushner | |
| 10,403,298 | B2 | 9/2019 | Baeckstroem et al. | |
| 2001/0044717 | A1 | 11/2001 | Ferhaoui et al. | |
| 2002/0065664 | A1 | 5/2002 | Witzgall et al. | |
| 2002/0153891 | A1 | 10/2002 | Smith et al. | |
| 2003/0028373 | A1 * | 2/2003 | Kandhadai | G10L 19/10 704/230 |
| 2003/0046067 | A1 | 3/2003 | Gradl | |
| 2004/0010406 | A1 | 1/2004 | Tavares | |
| 2004/0101048 | A1 | 5/2004 | Paris | |
| 2004/0172402 | A1 * | 9/2004 | Jabri | G10L 19/173 |
| 2005/0065785 | A1 * | 3/2005 | Bessette | G10L 19/10 704/211 |
| 2006/0116872 | A1 * | 6/2006 | Byun | G10L 19/24 704/E19.044 |
| 2006/0149540 | A1 * | 7/2006 | Singh | G10L 19/107 704/223 |
| 2006/0184362 | A1 | 8/2006 | Preuss et al. | |
| 2006/0271373 | A1 | 11/2006 | Khalil et al. | |
| 2007/0043560 | A1 | 2/2007 | Lee | |
| 2007/0206645 | A1 | 9/2007 | Sundqvist et al. | |
| 2007/0239462 | A1 | 10/2007 | Makinen et al. | |
| 2008/0049795 | A1 | 2/2008 | Lakaniemi | |
| 2008/0147414 | A1 | 6/2008 | Son et al. | |
| 2008/0294429 | A1 | 11/2008 | Su et al. | |
| 2009/0222273 | A1 | 9/2009 | Massaloux et al. | |
| 2009/0228267 | A1 * | 9/2009 | Ehara | G10L 19/107 704/219 |
| 2009/0281798 | A1 | 11/2009 | Brinker et al. | |
| 2009/0326930 | A1 | 12/2009 | Kawashima et al. | |
| 2010/0011041 | A1 | 1/2010 | Vannucci | |
| 2010/0014692 | A1 | 1/2010 | Schreiner et al. | |
| 2010/0049511 | A1 | 2/2010 | Ma et al. | |
| 2010/0153100 | A1 | 6/2010 | Kyung et al. | |
| 2010/0280831 | A1 | 11/2010 | Salami et al. | |
| 2011/0002263 | A1 | 1/2011 | Zhu et al. | |
| 2011/0196673 | A1 | 8/2011 | Sharma et al. | |
| 2011/0313777 | A1 | 12/2011 | Baeckstroem et al. | |
| 2012/0209604 | A1 | 8/2012 | Sehlstedt | |
| 2012/0213379 | A1 | 8/2012 | Kim et al. | |
| 2013/0144632 | A1 | 6/2013 | Sung | |
| 2013/0332177 | A1 | 12/2013 | Helmrich et al. | |
| 2014/0188465 | A1 | 7/2014 | Choo et al. | |
| 2015/0213810 | A1 | 7/2015 | Baeckstroem et al. | |
| 2016/0225387 | A1 | 8/2016 | Koppens et al. | |
| 2016/0372128 | A1 | 12/2016 | Baeckstroem et al. | |

FOREIGN PATENT DOCUMENTS

| | | | |
|---|---|---|---|
| EP | 0985328 | B1 | 3/2006 |
| EP | 1833047 | A1 | 9/2007 |
| EP | 1850327 | A1 | 10/2007 |
| EP | 1088302 | B1 | 7/2008 |
| EP | 2107556 | A1 | 10/2009 |
| FR | 2830970 | A1 | 4/2003 |
| JP | 1995020896 | A | 1/1995 |
| JP | 1998502191 | A | 2/1998 |
| JP | 2000515998 | A | 11/2000 |
| KR | 1020000074365 | A | 12/2000 |
| RU | 2010151983 | A | 6/2012 |
| RU | 2486609 | C2 | 6/2013 |
| WO | 9805030 | A1 | 2/1998 |
| WO | 9847313 | A2 | 10/1998 |
| WO | 2011026231 | A1 | 3/2011 |
| WO | 2011042464 | A1 | 4/2011 |
| WO | 2011048094 | A1 | 4/2011 |
| WO | 2012110415 | A1 | 8/2012 |
| WO | 2014096279 | A1 | 6/2014 |

OTHER PUBLICATIONS

Chen , et al., "Frequency-selective techniques based on singular value decomposition, (SVD), total least squares (TLS), and u bandpass filtering", 1994, In Proc. SPIE 2296, Advanced Signal Processing: Algorithms, Architectures, and Implementations V, 601' pp. 1-11.

Delprat , et al., "Fractional excitation and other efficient transformed codebooks for CELP coding of speech", 1992,Acoustics, Speech, and Signal Processing, 1992. ICASSP-92., 1992 IEEE International Conference on , vol. 1, No., pp. 329-332 vol. 1.

Demeure , et al., "Linear Statistical Models for Stationary Sequences and Related Algorithms for Cholesky Factorization of Toeplitz Matrices", 1987, In IEEE Transactions on Acoustics, Speech, and Signal Processing, vol. ASSP-35, No. I, pp. 29-42.

Kumar, R. Pravin, "High Computational Performance in Code Exited Linear Prediction Speech Model Using Faster Codebook Search Techniques", Computing: Theory and Applications, 2007. ICCTA '07. International Conference on, Klokata, 2007, pp. 458-462.

Moriya, Takehiro , "Improvement of Search of Excited Vector 10.3.1 COrrelation, Search of Frequency Domain, Audio Coding", Aggregate Corporation of Electronic Information Communication Society. First Edition, pp. 96-99.

Mukherjee, Bishwa Nath, et al., "On Some Properties of Postive Definite Toeplitz Matrices and Their Possible Applications", in Linear Algebra Appl 102:211-240, 1988, 30 pages.

Sanchez , et al., "Low-delay wideband speech coding using a new frequency domain approach", 1993, In Acoustics, Speech, and Signal Processing, 1993. ICASSP-93., 1993 IEEE International Conference on , vol. 2, no., pp. 415418, vol. 2.

(56) References Cited

OTHER PUBLICATIONS

Srivastava , "Fundamentals of Linear Prediction", 1999, Department for Electrical and Computer Engineering Mississippi State University, pp. 1-13.
Trancoso , "An Overview of Different Trends on CELP Coding", 1995, in Speech Recognition and Coding, New Advances and Trends. Edited by Rubio-Ayuso J. and Lopez-Soler J.M., NATO ASI Series, Springer 1995.
Zhou, Jian Guang, "A Modified Low-Bit-Rate ACELP Speech Coder and its Implementation", Thesis in the Department of Electrical and Computer Engineering, Concordia University, Montreal, Quebec, Nov. 2003, pp. 1-98.
"" ITU-T G.723.1.
"" Schnell et al., Proposed Core Experiment on AAC-ELD, Apr. 18, 2007.
"" 3GPP TS 26.445 V14.0.0, 3rd Generation Partnership Project, Technical Specification Group Services and System Aspects, Codec for Enhanced Voice Services (EVS), Detailed Algorithmic Description, (Release 14), Mar. 2017.
"" 3GPP TS 26.442 V14.0.0, 3rd Generation Partnership Project, Technical Specification Group Services and System Aspects, Codec for Enhanced Voice Services (EVS), ANSI C code (fixed-point), (Release 14), Mar. 2017.
"" 3GPP TS 26.443 V14.0.0, 3rd Generation Partnership Project, Technical Specification Group Services and System Aspects, Codec for Enhanced Voice Services (EVS), ANSI C code (floating-point), (Release 14), Mar. 2017.
"" 3GPP TR 26.952 V17.0.0, 3rd Generation Partnership Project, Technical Specification Group Services and System Aspects, Codec for Enhanced Voice Services (EVS), Performance Characterization, (Release 17), Apr. 2022.
"" 3GPP TS 26.403 V6.0.0, 3rd Generation Partnership Project, Technical Specification Group Services and System Aspects, General audio codec audio processing functions, Enhanced aacPlus general audio codec, Encoder specification AAC part, (Release 6), Sep. 2004.
"" ITU-T G.718, Series G: Transmission Systems and Media, Digital Systems and Networks, Digital terminal equipments—Coding of voice and audio signals, Jun. 2008.
"" 3GPP TS 26.445 V12.0.0, 3rd Generation Partnership Project, Technical Specification Group Services and System Aspects, Codec for Enhanced Voice Services (EVS), Detailed Algorithmic Description, (Release 12), Sep. 2014.
"" 3GPP TS 26.445 V14.2.0 (Dec. 2017)—3rd Generation Partnership Project; Technical Specification Group Services and System Aspects; Codec for Enhanced Voice Services (EVS); Detailed Algorithmic Description (Release 14)—675 pages., Dec. 2017.
"" 3GPP TS 26.445 V16.2.0, 3rd Generation Partnership Project, Technical Specification Group Services and System Aspects, Codec for Enhanced Voice Services (EVS), Detailed Algorithmic Description, (Release 16), Dec. 2021.
"" 3GPP TS 26.445 V17.0.0, 3rd Generation Partnership Project, Technical Specification Group Services and System Aspects, Codec for Enhanced Voice Services (EVS), Detailed Algorithmic Description, (Release 17), Apr. 2022.
"" Convolution theorem—Wikipedia.
"" 3GPP TS 26.447 V14.0.0, 3rd Generation Partnership Project, Technical Specification Group Services and System Aspects, Codec for Enhanced Voice Services (EVS), Error Concealment of Lost Packets (Release 14), Mar. 2017.
"" 3GPP TS 26.447 V16.0.0 (Mar. 2019)—3rd Generation Partnership Project; Technical Specification Group Services and System Aspects; Codec for Enhanced Voice Services (EVS); Error Concealment of Lost Packets (Release 16)—82 pages., Mar. 2019.
"" 3GPP TS 26.290 V10.0.0, 3rd Generation Partnership Project, Technical Specification Group Services and System Aspects, Audio codec processing functions, Extended Adaptive Multi-Rate—Wideband (AMR-WB+) codec, Transcoding functions (Release 10), Mar. 2011.
"" 3GPP TS 26.447 V14.2.0, 3rd Generation Partnership Project, Technical Specification Group Services and System Aspects, Codec for Enhanced Voice Services (EVS), Error Concealment of Lost Packets, (Release 14), Jun. 2020.
"" 3GPP TS 26.290 V2.0.0, 3rd Generation Partnership Project; Technical Specification Group Service and System Aspects, Audio codec processing functions; Extended AMR Wideband codec, Transcoding functions (Release 6), Sep. 2004.
"" 3GPP TS 26.290 version 6.1.0 Release 6), Universal Mobile Telecommunications System (UMTS), Audio codec processing functions, Extended Adaptive Multi-Rate—Wideband (AMR-WB+) codec, Transcoding functions, Dec. 2004.
"Annex A: Comfort noise aspects", ITU-T G.722.2, of the Telecommunication Standardization Sector of the International Telecommunication Union ("G.722.2"), Jan. 2002, 16 pp.
"Qualification Deliverables for the Fraunhofer IIS Candidate for EVS (including Technical Description and Report on Compliance to Design Constraints)", Fraunhofer IIS: Tdoc S4-130345, TSG SA4#72bis meeting, Mar. 11-15, 2013, San Diego, Mar. 11, 2013, 8 pp.
"Wideband Coding of Speech at around 16 kbit/s using Adaptive Multi-Rate Wideband (AMR-WB)", ITU-T G.722, Series G: Transmission Systems and Media, Digital Systems and Networks, Digital terminal equipments—Coding of analogue signals by methods other than PCM, Jul. 2003, 72 pp.
Bosi, Marina, "Introduction to Digital Audio Coding and Standards", Springer 2003, 2003, 442 pp.
Clark, G., "A unified approach to time- and frequency-domain realization of FIR adaptive digital filters", In IEEE Transactions on Acoustics, Speech, and Signal Processing, vol. 31, No. 5, pp. 1073-1083, Oct. 1983.
Fuchs, Guillaume, "MDCT-Based Coder for Highly Adaptive Speech and Audio Coding", 17th European Signal Processing Conference (EUSIPCO 2009), Glasgow, Scotland, Aug. 24-28, 2009, Aug. 24, 2009, 5 pp.
Hou, Huan, "Real-time Audio Error Concealment Method Based on Sinusoidal Model,", International Conference on audio Language and Image Processing, IEEE, Jul. 2008, Shanghai, P.R. China, DOI: 10.1109/ICALIP.2008.4590009, Aug. 2008, 8 pp.
Kondoz, "Digital Speech: Coding for Low bit Rate Communication Systems", (John Wiley & Sons 2004).
Lecomte, "An Improved Low Complexity AMR-WB+ Encoder using Neural Networks for Mode Selection", AES 123rd Convention, New York, NY, USA, Oct. 5-8, 2007 Convention Paper 7294 section 2.1.2.
Malvar, Henrique S., "Signal Processing with Lapped Transforms", Computer Science Engineering, 1992 , Chapter 5.
Oh, H, "A Fast Quantization Loop Algorithm for MP3/AAC Encoders", AES 29th International Conference (2006).
Ostergaar, Jan, "Real-Time Perceptual Moving-Horizon Multiple-Description Audio Coding", IEEE Transactions on Signal Processing, 4286 (2011), 2011, 14 pp.
Ravishankar, Channasandra, "Speech Coding", Hughes Network Systems, Germantown, MD. United States, https://doi.org/10.2172/325392, May 8, 1998, 144 pp.
Schnell, Markus, "Low Delay Filterbanks for Enhanced Low Delay Audio Coding", 2007 IEEE Workshop on Applications of Signal Processing to Audio and Acoustics Oct. 21, 2007, Oct. 21, 2007, 4 pp.
Virette, David, "Low Delay Transform for High Quality Low Delay Audio Coding", Signal and Image Processing, (Université de Rennes 1, 2012), 40-41, Jan. 2012, 197 pp.
Warren, J.D., "Analysis of the spectral envelope of sounds by the human brain", NeuroImage. Feb. 15, 2005;24(4):1052-7, https://pubmed.ncbi.nlm.nih.gov/15670682/#:~:text=Spectral%20envelope%20is%20the%20shape,of%20sounds%20such%20as%20vowels.

* cited by examiner

APPARATUS FOR ENCODING A SPEECH SIGNAL EMPLOYING ACELP IN THE AUTOCORRELATION DOMAIN

CROSS-REFERENCE TO RELATED APPLICATIONS

This application is a continuation of copending U.S. application Ser. No. 17/576,797 filed Jan. 14, 2022, which is a continuation of U.S. application Ser. No. 16/209,610, filed Dec. 4, 2018 (U.S. Pat. No. 11,264,043 issued Mar. 1, 2022), which is incorporated herein by reference in its entirety and which is a continuation of U.S. patent application Ser. No. 14/678,610 filed Apr. 3, 2015 (U.S. Pat. No. 10,170,129 issued Jan. 1, 2019), which is incorporated herein by reference in its entirety and which is a continuation of International Application No. PCT/EP2013/066074, filed Jul. 31, 2013, which is incorporated herein by reference in its entirety, and additionally claims priority from U.S. Application No. 61/710,137, filed Oct. 5, 2012, which is also incorporated herein by reference in its entirety.

BACKGROUND OF THE INVENTION

The present invention relates to audio signal coding, and, in particular, to an apparatus for encoding a speech signal employing ACELP in the autocorrelation domain.

In speech coding by Code-Excited Linear Prediction (CELP), the spectral envelope (or equivalently, short-time time-structure) of the speech signal is described by a linear predictive (LP) model and the prediction residual is modelled by a long-time predictor (LTP, also known as the adaptive codebook) and a residual signal represented by a codebook (also known as the fixed codebook). The latter, the fixed codebook, is generally applied as an algebraic codebook, where the codebook is represented by an algebraic formula or algorithm, whereby there is no need to store the whole codebook, but only the algorithm, while simultaneously allowing for a fast search algorithm. CELP codecs applying an algebraic codebook for the residual are known as Algebraic Code-Excited Linear Prediction (ACELP) codecs (see [1], [2], [3], 4]).

In speech coding, employing an algebraic residual codebook is the approach of choice in main stream codecs such as [17], [13], [18]. ACELP is based on modeling the spectral envelope by a linear predictive (LP) filter, the fundamental frequency of voiced sounds by a long time predictor (LTP) and the prediction residual by an algebraic codebook. The LTP and algebraic codebook parameters are optimized by a least squares algorithm in a perceptual domain, where the perceptual domain is specified by a filter.

The computationally most complex part of ACELP-type algorithms, the bottleneck, is optimization of the residual codebook. The only currently known optimal algorithm would be an exhaustive search of a size NP space for every sub-frame, where at every point, an evaluation of $O(N^2)$ complexity may be performed. Since typical values are sub-frame length N=64 (i.e. 5 ms) with p=8 pulses, this implies more than $10^{20}$ operations per second. Clearly this is not a viable option. To stay within the complexity limits set by hardware requirements, codebook optimization approaches have to operate with non-optimal iterative algorithms. Many such algorithms and improvements to the optimization process have been presented in the past, for example [17], [19], [20], [21], [22].

Explicitly, the ACELP optimisation is based on describing the speech signal x(n) as the output of a linear predictive model such that the estimated speech signal is $$\hat{x}(n) = -\sum_{k=1}^{m} a(k)\hat{x}(n-k) + \hat{e}(k) \tag{1}$$

where a(k) are the LP coefficients and ê(k) is the residual signal. In vector form, this equation can be expressed as $$\hat{x} = H\hat{e} \tag{2}$$

where matrix H is defined as the lower triangular Toeplitz convolution matrix with diagonal h(0) and lower diagonals h(1), . . . , h(39) and the vector h(k) is the impulse response of the LP model. It should be noted that in this notation the perceptual model (which usually corresponds to a weighted LP model) is omitted, but it is assumed that the perceptual model is included in the impulse response h(k). This omission has no impact on the generality of results, but simplifies notation. The inclusion of the perceptual model is applied as in [1].

The fitness of the model is measured by the squared error. That is, $$\delta^2 = \sum_{k=1}^{N} (x(k) - \hat{x}(k))^2 = (e - \hat{e})^H H^H H(e - \hat{e}). \tag{3}$$

This squared error is used to find the optimal model parameters. Here, it is assumed that the LTP and the pulse codebook are both used to model the vector e. The practical application can be found in the relevant publications (see [1-4]).

In practice, the above measure of fitness can be simplified as follows. Let the matrix $B=H^T H$ comprise the correlations of h(n), let $c_k$ be the k'th fixed codebook vector and set $\hat{e}=g\, c_k$, where g is a gain factor. By assuming that g is chosen optimally, then the codebook is searched by maximizing the search criterion $$\frac{C_k^2}{E_k} = \frac{(x^T H c_k)^2}{c_k^T B c_k} = \frac{(d^T c_k)^2}{c_k^T B c_k} \tag{4}$$

where $d=H^T x$ is a vector comprising the correlation between the target vector and the impulse response h(n) and superscript T denotes transpose. The vector d and the matrix B are computed before the codebook search. This formula is commonly used in optimization of both the LTP and the pulse codebook.

Plenty of research has been invested in optimising the usage of the above formula. For example, 1) Only those elements of matrix B are calculated that are actually accessed by the search algorithm. Or:
2) The trial-and-error algorithm of the pulse search is reduced to trying only such codebook vectors which have a high probability of success, based on prior screening (see for example [1,5]).

A practical detail of the ACELP algorithm is related to the concept of zero impulse response (ZIR). The concept appears when considering the original domain synthesis signal in comparison to the synthesised residual. The residual is encoded in blocks corresponding to the frame or sub-frame size. However, when synthesising the original domain signal with the LP model of Equation 1, the fixed length residual will have an infinite length "tail", corresponding to the impulse response of the LP filter. That is, although the residual codebook vector is of finite length, it will have an effect on the synthesis signal far beyond the current frame or sub-frame. The effect of a frame into the future can be calculated by extending the codebook vector with zeros and calculating the synthesis output of Equation 1 for this extended signal. This extension of the synthesised signal is known as the zero impulse response. Then, to take into account the effect of prior frames in encoding the current frame, the ZIR of the prior frame is subtracted from the target of the current frame. In encoding the current frame, thus, only that part of the signal is considered, which was not already modelled by the previous frame.

In practice, the ZIR is taken into account as follows: When a (sub)frame N−1 has been encoded, the quantized residual is extended with zeros to the length of the next (sub)frame N. The extended quantized residual is filtered by the LP to obtain the ZIR of the quantized signal. The ZIR of the quantized signal is then subtracted from the original (not quantized) signal and this modified signal forms the target signal when encoding (sub)frame N. This way, all quantization errors made in (sub)frame N−1 will be taken into account when quantizing (sub)frame N. This practice improves the perceptual quality of the output signal considerably.

However, it would be highly appreciated if further improved concepts for audio coding would be provided.

SUMMARY

According to an embodiment, an apparatus for encoding a speech signal by determining a codebook vector of a speech coding algorithm may have: a matrix determiner for determining an autocorrelation matrix R, and a codebook vector determiner for determining the codebook vector depending on the autocorrelation matrix R, wherein the matrix determiner is configured to determine the autocorrelation matrix R by determining vector coefficients of a vector r, wherein the autocorrelation matrix R includes a plurality of rows and a plurality of columns, wherein the vector r indicates one of the columns or one of the rows of the autocorrelation matrix R, wherein $R(i, j)=r(|i-j|)$, wherein R(i, j) indicates the coefficients of the autocorrelation matrix R, wherein i is a first index indicating one of a plurality of rows of the autocorrelation matrix R, and wherein j is a second index indicating one of the plurality of columns of the autocorrelation matrix R.

According to another embodiment, a method for encoding a speech signal by determining a codebook vector of a speech coding algorithm may have the steps of: determining an autocorrelation matrix R, and determining the codebook vector depending on the autocorrelation matrix R, wherein determining an autocorrelation matrix R includes determining vector coefficients of a vector r, wherein the autocorrelation matrix R includes a plurality of rows and a plurality of columns, wherein the vector r indicates one of the columns or one of the rows of the autocorrelation matrix R, wherein $R(i, j)=r(|i-j|)$, wherein R(i, j) indicates the coefficients of the autocorrelation matrix R, wherein i is a first index indicating one of a plurality of rows of the autocorrelation matrix R, and wherein j is a second index indicating one of the plurality of columns of the autocorrelation matrix R.

According to another embodiment, a decoder for decoding an encoded speech signal being encoded by an apparatus for encoding a speech signal by determining a codebook vector of a speech coding algorithm, which apparatus may have:

- a matrix determiner for determining an autocorrelation matrix R, and
- a codebook vector determiner for determining the codebook vector depending on the autocorrelation matrix R,
- wherein the matrix determiner is configured to determine the autocorrelation matrix R by determining vector coefficients of a vector r, wherein the autocorrelation matrix R includes a plurality of rows and a plurality of columns, wherein the vector r indicates one of the columns or one of the rows of the autocorrelation matrix R, wherein $$R(i, j) = r(|i-j|),$$

- wherein R(i, j) indicates the coefficients of the autocorrelation matrix R, wherein i is a first index indicating one of a plurality of rows of the autocorrelation matrix R, and wherein j is a second index indicating one of the plurality of columns of the autocorrelation matrix R to acquire a decoded speech signal.

According to another embodiment, a method for decoding an encoded speech signal being encoded according to the method for encoding a speech signal by determining a codebook vector of a speech coding algorithm, which method for encoding may have the steps of:

- determining an autocorrelation matrix R, and
- determining the codebook vector depending on the autocorrelation matrix R, wherein determining an autocorrelation matrix R includes determining vector coefficients of a vector r, wherein the autocorrelation matrix R includes a plurality of rows and a plurality of columns, wherein the vector r indicates one of the columns or one of the rows of the autocorrelation matrix R, wherein $$R(i, j) = r(|i-j|),$$

wherein R(i, j) indicates the coefficients of the autocorrelation matrix R, wherein i is a first index indicating one of a plurality of rows of the autocorrelation matrix R, and wherein j is a second index indicating one of the plurality of columns of the autocorrelation matrix R to acquire a decoded speech signal.

According to another embodiment, a system may have:

- an apparatus for encoding a speech signal by determining a codebook vector of a speech coding algorithm, which apparatus may have:
  - a matrix determiner for determining an autocorrelation matrix R, and
  - a codebook vector determiner for determining the codebook vector depending on the autocorrelation matrix R,
    - wherein the matrix determiner is configured to determine the autocorrelation matrix R by determining vector coefficients of a vector r, wherein the autocorrelation matrix R includes a plurality of rows and a plurality of columns, wherein the vector r indicates one of the columns or one of the rows of the autocorrelation matrix R, wherein $$R(i, j) = r(|i-j|),$$

wherein R(i, j) indicates the coefficients of the autocorrelation matrix R, wherein i is a first index indicating one of a plurality of rows of the autocorrelation matrix R, and wherein j is a second index indicating one of the plurality of columns of the autocorrelation matrix R, for encoding an input speech signal to acquire an encoded speech signal, and a decoder for decoding an encoded speech signal being encoded by an apparatus for encoding a speech signal by determining a codebook vector of a speech coding algorithm, which apparatus may have:

a matrix determiner for determining an autocorrelation matrix R, and a codebook vector determiner for determining the codebook vector depending on the autocorrelation matrix R, wherein the matrix determiner is configured to determine the autocorrelation matrix R by determining vector coefficients of a vector r, wherein the autocorrelation matrix R includes a plurality of rows and a plurality of columns, wherein the vector r indicates one of the columns or one of the rows of the autocorrelation matrix R, wherein $$R(i, j) = r(|i-j|),$$

wherein R(i, j) indicates the coefficients of the autocorrelation matrix R, wherein i is a first index indicating one of a plurality of rows of the autocorrelation matrix R, and wherein j is a second index indicating one of the plurality of columns of the autocorrelation matrix R to acquire a decoded speech signal, for decoding the encoded speech signal to acquire a decoded speech signal.

According to another embodiment, a method may have the steps of:

encoding an input speech signal according to the method for encoding a speech signal by determining a codebook vector of a speech coding algorithm, which method for encoding may have the steps of:

determining an autocorrelation matrix R, and determining the codebook vector depending on the autocorrelation matrix R, wherein determining an autocorrelation matrix R includes determining vector coefficients of a vector r, wherein the autocorrelation matrix R includes a plurality of rows and a plurality of columns, wherein the vector r indicates one of the columns or one of the rows of the autocorrelation matrix R, wherein $$R(i, j) = r(|i-j|),$$

wherein R(i, j) indicates the coefficients of the autocorrelation matrix R, wherein i is a first index indicating one of a plurality of rows of the autocorrelation matrix R, and wherein j is a second index indicating one of the plurality of columns of the autocorrelation matrix R, to acquire an encoded speech signal, and decoding the encoded speech signal according to the method for decoding an encoded speech signal being encoded according to the method for encoding a speech signal by determining a codebook vector of a speech coding algorithm, which method for encoding may have the steps of:

determining an autocorrelation matrix R, and determining the codebook vector depending on the autocorrelation matrix R, wherein determining an autocorrelation matrix R includes determining vector coefficients of a vector r, wherein the autocorrelation matrix R includes a plurality of rows and a plurality of columns, wherein the vector r indicates one of the columns or one of the rows of the autocorrelation matrix R, wherein $$R(i, j) = r(|i-j|),$$

wherein R(i, j) indicates the coefficients of the autocorrelation matrix R, wherein i is a first index indicating one of a plurality of rows of the autocorrelation matrix R, and wherein j is a second index indicating one of the plurality of columns of the autocorrelation matrix R, to acquire a decoded speech signal, to acquire a decoded speech signal.

Another embodiment may have a computer program for implementing, when being executed on a computer or signal processor, the method for encoding a speech signal by determining a codebook vector of a speech coding algorithm, which method may have the steps of:

determining an autocorrelation matrix R, and determining the codebook vector depending on the autocorrelation matrix R, wherein determining an autocorrelation matrix R includes determining vector coefficients of a vector r, wherein the autocorrelation matrix R includes a plurality of rows and a plurality of columns, wherein the vector r indicates one of the columns or one of the rows of the autocorrelation matrix R, wherein $$R(i, j) = r(|i-j|),$$

wherein R(i, j) indicates the coefficients of the autocorrelation matrix R, wherein i is a first index indicating one of a plurality of rows of the autocorrelation matrix R, and wherein j is a second index indicating one of the plurality of columns of the autocorrelation matrix R.

Another embodiment may have a computer program for implementing, when being executed on a computer or signal processor, the method for decoding an encoded speech signal being encoded according to the method for encoding a speech signal by determining a codebook vector of a speech coding algorithm, which method for encoding may have the steps of:

determining an autocorrelation matrix R, and determining the codebook vector depending on the autocorrelation matrix R, wherein determining an autocorrelation matrix R includes determining vector coefficients of a vector r, wherein the autocorrelation matrix R includes a plurality of rows and a plurality of columns, wherein the vector r indicates one of the columns or one of the rows of the autocorrelation matrix R, wherein $$R(i, j) = r(|i - j|),$$

wherein R(i, j) indicates the coefficients of the autocorrelation matrix R, wherein i is a first index indicating one of a plurality of rows of the autocorrelation matrix R, and wherein j is a second index indicating one of the plurality of columns of the autocorrelation matrix R, to acquire a decoded speech signal.

Another embodiment may have a computer program for implementing, when being executed on a computer or signal processor, the method which may have the steps of:

encoding an input speech signal according to the method for encoding a speech signal by determining a codebook vector of a speech coding algorithm, which method for encoding may have the steps of:

determining an autocorrelation matrix R, and determining the codebook vector depending on the autocorrelation matrix R, wherein determining an autocorrelation matrix R includes determining vector coefficients of a vector r, wherein the autocorrelation matrix R includes a plurality of rows and a plurality of columns, wherein the vector r indicates one of the columns or one of the rows of the autocorrelation matrix R, wherein $$R(i, j) = r(|i - j|),$$

wherein R(i, j) indicates the coefficients of the autocorrelation matrix R, wherein i is a first index indicating one of a plurality of rows of the autocorrelation matrix R, and wherein j is a second index indicating one of the plurality of columns of the autocorrelation matrix R, to acquire an encoded speech signal, and decoding the encoded speech signal according to the method for decoding an encoded speech signal being encoded according to the method for encoding a speech signal by determining a codebook vector of a speech coding algorithm, which method for encoding may have the steps of:

determining an autocorrelation matrix R, and determining the codebook vector depending on the autocorrelation matrix R, wherein determining an autocorrelation matrix R includes determining vector coefficients of a vector r, wherein the autocorrelation matrix R includes a plurality of rows and a plurality of columns, wherein the vector r indicates one of the columns or one of the rows of the autocorrelation matrix R, wherein $$R(i, j) = r(|i - j|),$$

wherein R(i, j) indicates the coefficients of the autocorrelation matrix R, wherein i is a first index indicating one of a plurality of rows of the autocorrelation matrix R, and wherein j is a second index indicating one of the plurality of columns of the autocorrelation matrix R, to acquire a decoded speech signal, to acquire a decoded speech signal.

The apparatus is configured to use the codebook vector to encode the speech signal. For example, the apparatus may generate the encoded speech signal such that the encoded speech signal comprises a plurality of Linear Prediction coefficients, an indication of the fundamental frequency of voiced sounds (e.g., pitch parameters), and an indication of the codebook vector, e.g, an index of the codebook vector.

Moreover, a decoder for decoding an encoded speech signal being encoded by an apparatus according to the above-described embodiment to obtain a decoded speech signal is provided.

Furthermore a system is provided. The system comprises an apparatus according to the above-described embodiment for encoding an input speech signal to obtain an encoded speech signal. Moreover, the system comprises a decoder according to the above-described embodiment for decoding the encoded speech signal to obtain a decoded speech signal.

Improved concepts for the objective function of the speech coding algorithm ACELP are provided, which take into account not only the effect of the impulse response of the previous frame to the current frame, but also the effect of the impulse response of the current frame into the next frame, when optimizing parameters of current frame. Some embodiments realize these improvements by changing the correlation matrix, which is central to conventional ACELP optimisation to an autocorrelation matrix, which has Hermitian Toeplitz structure. By employing this structure, it is possible to make ACELP optimisation more efficient in terms of both computational complexity as well as memory requirements. Concurrently, also the perceptual model applied becomes more consistent and interframe dependencies can be avoided to improve performance under the influence of packet-loss.

Speech coding with the ACELP paradigm is based on a least squares algorithm in a perceptual domain, where the perceptual domain is specified by a filter. According to embodiments, the computational complexity of the conventional definition of the least squares problem can be reduced by taking into account the impact of the zero impulse response into the next frame. The provided modifications introduce a Toeplitz structure to a correlation matrix appearing in the objective function, which simplifies the structure and reduces computations. The proposed concepts reduce computational complexity up to 17% without reducing perceptual quality.

Embodiments are based on the finding that by a slight modification of the objective function, complexity in the optimization of the residual codebook can be further reduced. This reduction in complexity comes without reduction in perceptual quality. As an alternative, since ACELP residual optimization is based on iterative search algorithms, with the presented modification, it is possible to increase the number of iterations without an increase in complexity, and in this way obtain an improved perceptual quality.

Both the conventional as well as the modified objective functions model perception and strive to minimize perceptual distortion. However, the optimal solution to the conventional approach is not necessarily optimal with respect to the modified objective function and vice versa. This alone does not mean that one approach would be better than the other, but analytic arguments do show that the modified objective function is more consistent. Specifically, in contrast to the conventional objective function, the provided concepts treat all samples within a sub-frame equally, with consistent and well-defined perceptual and signal models.

In embodiments, the proposed modifications can be applied such that they only change the optimization of the residual codebook. It does therefore not change the bit-stream structure and can be applied in a back-ward compatible manner to existing ACELP codecs.

Moreover, a method for encoding a speech signal by determining a codebook vector of a speech coding algorithm is provided. The method comprises:

Determining an autocorrelation matrix R. And:

Determining the codebook vector depending on the autocorrelation matrix R.

Determining an autocorrelation matrix R comprises determining vector coefficients of a vector r. The autocorrelation matrix R comprises a plurality of rows and a plurality of columns. The vector r indicates one of the columns or one of the rows of the autocorrelation matrix R, wherein $$R(i, j) = r(|i-j|).$$

R(i, j) indicates the coefficients of the autocorrelation matrix R, wherein i is a first index indicating one of a plurality of rows of the autocorrelation matrix R, and wherein j is a second index indicating one of the plurality of columns of the autocorrelation matrix R.

Furthermore, a method for decoding an encoded speech signal being encoded according to the method for encoding a speech signal according to the above-described embodiment to obtain a decoded speech signal is provided.

Moreover, a method is provided. The method comprises:

Encoding an input speech signal according to the above-described method for encoding a speech signal to obtain an encoded speech signal. And:

Decoding the encoded speech signal to obtain a decoded speech signal according to the above-described method for decoding a speech signal.

Furthermore, computer programs for implementing the above-described methods when being executed on a computer or signal processor are provided.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
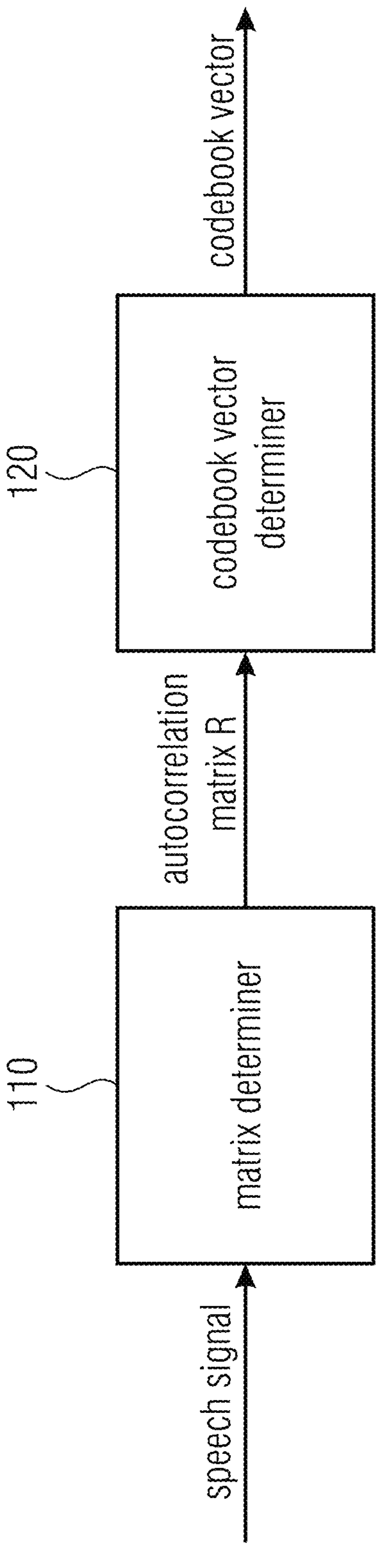
FIG. 1 illustrates an apparatus for encoding a speech signal by determining a codebook vector of a speech coding algorithm according to an embodiment.

FIG. 1 illustrates an apparatus for encoding a speech signal by determining a codebook vector of a speech coding algorithm according to an embodiment.

The apparatus comprises a matrix determiner (110) for determining an autocorrelation matrix R, and a codebook vector determiner (120) for determining the codebook vector depending on the autocorrelation matrix R.

The matrix determiner (110) is configured to determine the autocorrelation matrix R by determining vector coefficients of a vector r.

The autocorrelation matrix R comprises a plurality of rows and a plurality of columns, wherein the vector r indicates one of the columns or one of the rows of the autocorrelation matrix R, wherein R(i, j)=r(|i−j|).

R(i, j) indicates the coefficients of the autocorrelation matrix R, wherein i is a first index indicating one of a plurality of rows of the autocorrelation matrix R, and wherein j is a second index indicating one of the plurality of columns of the autocorrelation matrix R.

The apparatus is configured to use the codebook vector to encode the speech signal. For example, the apparatus may generate the encoded speech signal such that the encoded speech signal comprises a plurality of Linear Prediction coefficients, an indication of the fundamental frequency of voiced sounds (e.g. pitch parameters), and an indication of the codebook vector.

For example, according to a particular embodiment for encoding a speech signal, the apparatus may be configured to determine a plurality of linear predictive coefficients (a(k)) depending on the speech signal. Moreover, the apparatus is configured to determine a residual signal depending on the plurality of linear predictive coefficients (a(k)). Furthermore, the matrix determiner 110 may be configured to determine the autocorrelation matrix R depending on the residual signal.

In the following, some further embodiments of the present invention are described.

Returning to equations 3 and 4, wherein Equation 3 defines a squared error indicating a fitness of the perceptual model as:

$$\delta^2 = \sum_{k=1}^{N} (x(k) - \hat{x}(k))^2 = (e - \hat{e})^H H^H H (e - \hat{e}), \tag{3}$$

and wherein Equation 4

$$\frac{C_k^2}{E_k} = \frac{(x^T H c_k)^2}{c_k^T B c_k} = \frac{(d^T c_k)^2}{c_k^T B c_k}. \tag{4}$$

indicates the search criterion, which is to be maximized.

The ACELP algorithm is centred around Equation 4, which in turn is based on Equation 3.

Embodiments are based on the finding that analysis of these equations reveals that the quantized residual values e(k) have a very different effect on the error energy $\delta^2$ depending on the index k. For example, when considering the indices k=1 and k=N, if the only non-zero value of the residual codebook would appear at k=1, then the error energy $\delta^2$ results to:

$$\delta_1^2 = \sum_{k=1}^{N} (x(k) - e(1)h(k))^2 \tag{5}$$

while for k=N, the error energy $\delta^2$ results to:

$$\delta_N^2 = (x(N) - e(N)h(1))^2 + \sum_{k=1}^{N-1} (x(k))^2. \tag{6}$$

In other words, e(1) is weighted with the impulse response h(k) on the range 1 to N, while e(N) is weighted with only h(1). In terms of spectral weighting, this means that each e(k) is weighted with a different spectral weighting function, such that, in the extreme, e(N) is linearly-weighted. From a perceptual modelling perspective, it would make sense to apply the same perceptual weight for all samples within a frame. Equation 3 should thus be extended such that it takes into account the ZIR into the next frame. It should be noticed that here, inter alia, the difference to conventional technology is that both the ZIR from the previous frame and also the ZIR into the next frame are taken into account.

Let e(k) be the original, unquantized residual and ê(k) the quantised residual. Furthermore, let both residuals be non-zero in the range 1 to N and zero elsewhere. Then $$x(n) = -\sum_{k=1}^{m} a(k)x(n-k) + e(n) = \sum_{k=1}^{\infty} e(n-k)h(k) \tag{7}$$
$$\hat{x}(n) = -\sum_{k=1}^{m} a(k)\hat{x}(n-k) + \hat{e}(n) = \sum_{k=1}^{\infty} \hat{e}(n-k)h(k)$$

Equivalently, the same relationships in matrix form can be expressed as:

$$x = \tilde{H}e \tag{8}$$
$$\hat{x} = \tilde{H}\hat{e}$$

where $\tilde{H}$ is the infinite dimensional convolution matrix corresponding to the impulse response h(k). Inserting into Equation 3 yields $$\hat{o}^2 = \|\tilde{H}e - \tilde{H}\hat{e}\|^2 = (e-\hat{e})^T\tilde{H}^T\tilde{H}(e-\hat{e}) = (e-\hat{e})^T R(e-\hat{e}) \tag{9}$$

where $R=\tilde{H}^T\tilde{H}$ is the finite size, Hermitian Toeplitz matrix corresponding to the autocorrelation of h(n). By a similar derivation as for Equation 4, the objective function is obtained:

$$\frac{(e^T R\hat{e})^2}{(\hat{e}^T R\hat{e})} = \frac{(d^T e)^2}{(\hat{e}^T R\hat{e})}. \tag{10}$$

This objective function is very similar to Equation 4. The main difference is that instead of the correlation matrix B, here a Hermitian Toeplitz matrix R is in the denominator.

As explained above, this novel formulation has the benefit that all samples of the residual e within a frame will receive the same perceptual weighting. However, importantly, this formulation introduces considerable benefits to computational complexity and memory requirements as well. Since R is a Hermitian Toeplitz matrix, the first column r(0). . . r(N−1) defines the matrix completely. In other words, instead of storing the complete N×N matrix, it is sufficient to store only the N×1 vector r(k), thus yielding a considerable saving in memory allocation. Moreover, computational complexity is also reduced since it is not necessary to determine all N×N elements, but only the first N×1 column. Also indexing within the matrix is simple, since the element (i,j) can be found by R(i, j)=r(|i−j|).

Since the objective function in Equation 10 is so similar to Equation 4, the structure of the general ACELP can be retained. Specifically, any of the following operations can be performed with either objective function, with only minor modifications to the algorithm:

1. Optimisation of the LTP lag (adaptive codebook)
2. Optimisation of the pulse codebook for modelling the residual (fixed codebook)
3. Optimisation of the gains of LTP and pulses, either separately or jointly
4. Optimisation of any other parameters whose performance can be measured by the squared error of Equation 3.

The only part that has to be modified in conventional ACELP applications is the handling of the correlation matrix B, which is replaced by matrix R, as well as the target, which may include the ZIR into the following frame.

Some embodiments employ the concepts of the present invention by, wherever in the ACELP algorithm, where the correlation matrix B appears, it is replaced by the autocorrelation matrix R. If all instances of the matrix B are omitted, then calculating its value can be avoided.

For example, the autocorrelation matrix R is determined by determining the coefficients of the first column r(0), . . . , r(N−1) of the autocorrelation matrix R.

The matrix R is defined in Equation 9 by $R=H^TH$, whereby its elements $R_{ij}$=r(i−j) can be calculated through $$r(k) = h(k) * h(-k) = \sum_l h(l)h(l-k) \tag{9a}$$

That is, the sequence r(k) is the autocorrelation of h(k).

Often, however, r(k) can be obtained by even more effective means. Specifically, in speech coding standards such as AMR and G.718, the sequence h(k) is the impulse response of a linear predictive filter A(z) filtered by a perceptual weighting function W(z), which is taken to include the pre-emphasis. In other words, h(k) indicates a perceptually weighted impulse response of a linear predictive model.

The filter A(z) is usually estimated from the autocorrelation of the speech signal $r_x(k)$, that is, $r_x(k)$ is already known. Since $H(z)=A^{-1}(u)W(z)$, it follows that the autocorrelation sequence r(k) can be determined by calculating the autocorrelation of w(k) by $$r_w(k) = w(k) * w(-k) = \sum_l w(l)w(l-k) \tag{9b}$$

whereby the autocorrelation of h(k) is $$r(k) = r_x(k) * r_w(k) = \sum_l r_w(l)r_x(l-k). \tag{9c}$$

Depending on the design of the overall system, these equations may, in some embodiments, be modified accordingly.

A codebook vector of a codebook may then, e.g., be determined based on the autocorrelation matrix R. In particular, Equation 10 may, according to some embodiments, be used to determine a codebook vector of the codebook.

In this context, Equation 10 defines the objective function in the form $$f(\hat{e}) = \frac{(d^T\hat{e})^2}{\hat{e}^T R\hat{e}}$$

which is otherwise the same form as in the speech coding standards AMR and G.718 but such that the matrix R now has symmetric Toeplitz structure. The objective function is basically a normalized correlation between the target vector d and the codebook vector ê and the best possible codebook vector is that, which gives the highest value for the normalized correlation $f(\hat{e})$, e.g., which maximizes the normalized correlation $f(e)$.

Codebook vectors can thus optimized with the same approaches as in the mentioned standards. Specifically, for example, the very simple algorithm for finding the best algebraic codebook (i.e. the fixed codebook) vector ê for the residual can be applied, as described below. It should, however, be noted, that significant effort has been invested in the design of efficient search algorithms (c.f. AMR and G.718), and this search algorithm is only an illustrative example of application.

1. Define an initial codebook vector $\hat{e}_0=[0,0\ \dots\ 0]^T$ and set the number of pulses to p=0.
2. Set the initial codebook quality measure to $f_0=0$.
3. Set temporary codebook quality measure to $\hat{f}_p=f_{p-1}$.
4. For each position k in the codebook vector
   (i) Increase p by one.
   (ii) If position k already contains a negative pulse, continue to step vii.
   (iii) Create a temporary codebook vector $$\varepsilon_p^+ = \hat{e}_{p-1}$$

and add a positive pulse at position k.

(iv) Evaluate the quality of the temporary codebook vector by $$f(\varepsilon_p^+).$$

(v) If the temporary codebook vector is better than any of the previous, $$f(\varepsilon_p^+) > \hat{f}_p,$$

then save this codebook vector, set $$\hat{f}_p = f(\varepsilon_p^+)$$

and continue to next iteration.

(vi) If position k already contains a positive pulse, continue to next iteration.
   (vii) Create a temporary codebook vector $$\varepsilon_p^- = \hat{e}_{p-1}$$

and add a negative pulse at position k.

(viii) Evaluate the quality of the temporary codebook vector by $$f(\varepsilon_p^-).$$

(ix) If the temporary codebook vector is better than any of the previous, $$f(\varepsilon_p^-) > \hat{f}_p,$$

then save this codebook vector, set $$\hat{f}_p = f(\varepsilon_p^-)$$

and continue to next iteration.

5. Define the codebook vector ep to be the last (that is, best) of the saved codebook vectors.
6. If the number of pulses p has reached the desired number of pulses, then define the output vector as $\hat{e}=\hat{e}_p$, and stop. Otherwise, continue with step 4.

As already pointed out, compared to conventional ACELP applications, in some embodiments, the target is modified such that it includes the ZIR into the following frame.

Equation 1 describes the linear predictive model used in ACELP-type codecs. The Zero Impulse Response (ZIR, also sometimes known as the Zero Input Response), refers to the output of the linear predictive model when the residual of the current frame (and all future frames) is set to zero. The ZIR can be readily calculated by defining the residual which is zero from position N forward as $$e'_K(n) = \begin{cases} e(n) & \text{for } n < K \\ 0 & \text{for } n \geq K \end{cases} \tag{10a}$$

whereby the ZIR can be defined as $$ZIR_K(n) = \sum_{k=0}^{N} h(k)e'_K(n-k). \tag{10b}$$

By subtracting this ZIR from the input signal, a signal is obtained which depends on the residual only from the current frame forward.

Equivalently, the ZIR can be determined by filtering the past input signal as $$ZIR_K(n) = \begin{cases} x(n) & \text{for } n < K \\ -\sum_{k=1}^{m} a(k)ZIR_K(n-k) & \text{for } n \geq K \end{cases}. \tag{10c}$$

The input signal where the ZIR has been removed is often known as the target and can be defined for the frame that begins at position K as $d(n)=x(n)-ZIR_K(n)$. This target is in principle exactly equal to the target in the AMR and G.718 standards. When quantizing the signal, the quantized signal $\hat{d}(n)$ is compared to d(n) for the duration of a frame $K \leq n < K+N$.

Conversely, the residual of the current frame has an influence on the following frames, whereby it is useful to consider its influence when quantizing the signal, that is, one thus may want to evaluate the difference $\hat{d}(n)-d(n)$ also beyond the current frame, n>K+N. However, to do that, one mey want to consider the influence of the residual of the current frame only by setting residuals of the following frames to zero. Therefore, the ZIR of $\hat{d}(n)$ into the next frame may be compared. In other words, the modified target is obtained:

$$d'(n) = \begin{cases} 0 & n < K \\ d(n) & K \le n < K+N \\ -\sum_{k=1}^{m} a(k)d'(n-k) & n > K+N \end{cases}. \quad (10d)$$

Equivalently, using the impulse response h(n) of A(z), then $$d'(n) = \sum_{k=K}^{K+N-1} e(k)h(n-k). \quad (10e)$$

This formula can be written in a convenient matrix form by d'=He where H and e are defined as in Equation 2. It can be seen that the modified target is exactly x of Equation 2.

In calculation of matrix R, note that in theory, the impulse response h(k) is an infinite sequence, which is not realisable in a practical system.

However, either 1) truncating or windowing the impulse response to a finite length and determining the autocorrelation of the truncated impulse response, or
2) calculating the power spectrum of the impulse response using the Fourier spectra of the associated LP and perceptual filters, and obtain the autocorrelation by an inverse Fourier transform is possible.

Now, an extension employing LTP is described.

The long-time predictor (LTP) is actually also a linear predictor.

According to an embodiment, the matrix determiner 110 may be configured to determine the autocorrelation matrix R depending on a perceptually weighted linear predictor, for example, depending on the long-time predictor.

The LP and LTP can be convolved into one joint predictor, which includes both the spectral envelope shape as well as the harmonic structure. The impulse response of such a predictor will be very long, whereby it is even more difficult to handle with conventional technology. However, if the autocorrelation of the linear predictor is already known, then the autocorrelation of the joint predictor can be calculated by simply filtering the autocorrelation with the LTP forward and backward, or with a similar process in the frequency domain.

Note that prior methods employing LTP have a problem when the LTP lag is shorter than the frame length, since the LTP would cause a feedback loop within the frame. The benefit of including the LTP in the objective function is that when the lag of the LTP is shorter than frame length, then this feedback is explicitly taken into account in the optimisation.

In the following, an extension for fast optimisation in an uncorrelated domain is described.

A central challenge in design of ACELP systems has been reduction of computational complexity. ACELP systems are complex because filtering by LP causes complicated correlations between the residual samples, which are described by the matrix B or in the current context by matrix R. Since the samples of e(n) are correlated, it is not possible to just quantise e(n) with desired accuracy, but many combinations of different quantisations with a trial-and-error approach have to be tried, to find the best quantisation with respect to the objective function of Equation 3 or 10, respectively.

By the introduction of the matrix R, a new perspective to these correlations is obtained. Namely, since R has Hermitian Toeplitz structure, several efficient matrix decompositions can be applied, such as the singular value decomposition, Cholesky decomposition or Vandermonde decomposition of Hankel matrices (Hankel matrices are upside-down Toeplitz matrices, whereby the same decompositions can be applied to Toeplitz and Hankel matrices) (see [6] and [7]). Let R=E D $E^H$ be a decomposition of R such that D is a diagonal matrix of the same size and rank as R. Equation 9 can then be modified as follows:

$$\delta^2 = (e-\hat{e})^H R(e-\hat{e}) = (e-\hat{e})^H EDE^H(e-\hat{e}) = (f-\hat{f})D(f-\hat{f}) \quad (11)$$

where $\hat{f}=E^H\hat{e}$. Since D is diagonal, the error for each sample of f(k) is independent of other samples f(i). In Equation 10, it is assumed that the codebook vector is scaled by the optimal gain, whereby the new objective function is $$\frac{(f^H D\hat{f})^2}{\hat{f}^H D\hat{f}}. \quad (12)$$

Here, the samples are again correlated (since changing the quantization of one line changes the optimal gain for all lines), but in comparison to Equation 10, the effect of correlation is here limited. However, even if the correlation is taken into account, optimisation of this objective function is much simpler than optimisation of Equations 3 or 10.

Using this decomposition approach, it is possible 1. to apply any conventional scalar or vector quantization technique with desired accuracy, or
2. to use Equation 12 as the objective function with any conventional ACELP pulse search algorithm.

Both approaches give a near-optimal quantization with respect to Equation 12. Since conventional quantization techniques generally do not require any brute-force methods (for the exception of a possible rate-loop), and because the matrix D is simpler than either B or R, both quantization methods are less complex than conventional ACELP pulse search algorithms. The main source of computational complexity in this approach is thus the computation of the matrix decomposition.

Some embodiments employ equation 12 to determine a codebook vector of the codebook.

E.g., several matrix factorizations for R of the form $R=E^H DE$ exist. For example, (a) The eigenvalue decomposition can be calculated for example by using the GNU Scientific Library (http://www.gnu.org/software/gsl/manual/html_node/Real-Symmetric-Matrices.html). The matrix R is real and symmetric (as well as Toeplitz), whereby the function "gsl_eigen_symm( )" can be used to determine the matrices E and D. Other implementations of the same eigenvalue decomposition are readily available in literature [6].
(b) The Vandermonde factorization of Toeplitz matrices [7] can be used using the algorithm described in [8].

This algorithm returns matrices E and D such that E is a Vandermonde matrix, which is equivalent to a discrete Fourier transform with non-uniform frequency distribution.

Using such factorizations, the residual vector e can be transformed to the transform domain by $f=E^He$ or $f'=D^{1/2}E^He$. Any common quantization method can be applied in this domains, for example, 1. The vector $f'$ can be quantized by an algebraic codebook exactly as in common implementations of ACELP. However, since the elements of $f'$ are uncorrelated, a complicated search function as in ACELP is not needed, but a simple algorithm can be applied, such as
   (a) Set initial gain to g=1
   (b) Quantize f' by $\hat{f}'$=round(gf').
   (c) If the number of pulses in $f'$ is larger than a pre-defined amount p, $\|\hat{f}'\|_1>p$, then increase gain g and return to step b.
   (d) Otherwise, if the number of pulses in $\hat{f}'$ is smaller than a pre-defined amount p, $\|\hat{f}'\|_1<p$, then decrease gain g and return to step b.
   (e) Otherwise, the number of pulses in $\hat{f}'$ is equal to the pre-defined amount p, $\|\hat{f}'\|_1=p$, and processing can be stopped.
2. An arithmetic coder can be used similar to that used in quantization of spectral lines in TCX in the standards AMR-WB+ or MPEG USAC.

It should be noted that since the elements of f' are orthogonal (as can be seen from Equation 12) and they have the same weight in the objective function of Equation 12, they can be quantized separately, and with the same quantization step size. That quantization will automatically find the optimal (the largest) value of the objective function in Equation 12, which is possible with that quantization accuracy. In other words, the quantization algorithms presented above, will both return the optimal quantization with respect to Equation 12.

This advantage of optimality is tied to the fact that the elements of f' can be treated separately. If a codebook approach would be used, where the codebook vectors $c_k$ are non-trivial (have more than one non-zero elements), then these codebook vectors would not have independent elements anymore and the advantage of the matrix factorization is lost.

Observe that the Vandermonde factorization of a Toeplitz matrix can be chosen such that the Vandermonde matrix is a Fourier transform matrix but with unevenly distributed frequencies. In other words, the Vandermonde matrix corresponds to a frequency-warped Fourier transform. It follows that in this case the vector f corresponds to a frequency domain representation of the residual signal on a warped frequency scale (see the "root-exchange property" in [8]).

Importantly, notice that this consequence is not well-known. In practice, this result states that if a signal x is filtered with a convolution matrix C, then $$\|Cx\|^2=\|DVx\|^2 \tag{13}$$

where V is a (e.g., warped) Fourier transform (which is a Vandermonde matrix with elements on the unit circle) and D a diagonal matrix. That is, if it is desired to measure the energy of a filtered signal, the energy of frequency-warped signal can equivalently be measured. In converse, any evaluation that shall be done in a warped Fourier domain, can equivalently be done in a filtered time-domain. Due to the duality of time and frequency, an equivalence between time-domain windowing and time-warping also exists. A practical issue is, however, that finding a convolution matrix C which satisfies the above relationship is a numerically sensitive problem, whereby often it is easier to find approximate solutions $\hat{C}$ instead.

The relation $\|C\ x\|^2=\|D\ V\ x\|^2$ can be employed for determining a codebook vector of a codebook.

For this, it should first be noted that here, by H, a convolution matrix like in Equation 2 will be denoted instead of C. If, then, one wants to minimize the quantization noise $e=Hx-H\hat{x}$, its energy can be measured:

$$\begin{aligned}\varepsilon^2=\|Hx-H\hat{x}\|^2=\|H(x-\hat{x})\|^2=\\ (x-\hat{x})^TH^TH(x-\hat{x})=(x-\hat{x})^TR(x-\hat{x})=(x-\hat{x})^TV^HDV(x-\hat{x})=\\ \|D^{1/2}V(x-\hat{x})\|^2=\|D^{1/2}V(x-\hat{x})\|^2=\left\|D^{1/2}(f-\hat{f})\right\|^2=\left\|f'-\hat{f}'\right\|^2.\end{aligned} \tag{13a}$$

Now, an extension for frame-independence is described.

When the encoded speech signal is transmitted over imperfect transmission lines such as radio-waves, invariably, packets of data will sometimes be lost. If frames are dependent on each other, such that packet N is needed to perfectly decode N−1, then the loss of packet N−1 will corrupt the synthesis of both packets N−1 and N. If, on the other hand, frames are independent, then the loss of packet N−1 will corrupt the synthesis of packet N−1 only. It is therefore important to device methods that are free from inter-frame dependencies.

In conventional ACELP systems, the main source of inter-frame dependency is the LTP and to some extent also the LP. Specifically, since both are infinite impulse response (IIR) filters, a corrupted frame will cause an "infinite" tail of corrupted samples. In practice, that tail can be several frames long, which is perceptually annoying.

Using the framework of the current invention, the path through which inter-frame dependency is generated can be quantified by the ZIR from the current frame into the next is realized. To avoid this inter-frame dependency, three modifications to the conventional ACELP need to be made.

1. When calculating the ZIR from the previous frame into the current (sub)frame, it should be calculated from the original (not quantized) residual extended with zeros, not from the quantized residual. In this way, the quantization errors from the previous (sub)frame will not propagate into the current (sub)frame.
2. When quantizing the current frame, the error in the ZIR into the next frame between the original and quantized signals may be taken into account. This can be done by replacing the correlation matrix B with the autocorrelation matrix R, as explained above. This ensures that the error in the ZIR into the next frame is minimised together with the error within the current frame.
3. Since the error propagation is due to both the LP and the LTP, both components may be included in the ZIR. This is in difference to the conventional approach where the ZIR is calculated for the LP only.

If quantization errors of previous frame when quantizing the current frame are not taken into account, efficiency in perceptual quality of the output is lost. Therefore, it is possible to choose to take previous errors into account when there is no risk of error propagation. For example, conventional ACELP system apply a framing where every 20 ms frame is sub-divided into 4 or 5 subframes. The LTP and the residual are quantized and coded separately for each sub-frame, but the whole frame is transmitted as one block of data. Therefore, individual subframes cannot be lost, but only complete frames. It follows that it is important to use frame-independent ZIRs only at frame borders, but ZIRs can be used with interframe dependencies between the remaining subframes.

Embodiments modify conventional ACELP algorithms by inclusion of the effect of the impulse response of the current frame into the next frame, into the objective function of the current frame. In the objective function of the optimisation problem, this modification corresponds to replacing a correlation matrix with an autocorrelation matrix that has Hermitian Toeplitz structure. This modification has the following benefits:

1. Computational complexity and memory requirements are reduced due to the added Hermitian Toeplitz structure of the autocorrelation matrix.
2. The same perceptual model will be applied on all samples, making the design and tuning of the perceptual model simpler, and its application more efficient and consistent.
3. Inter-frame correlations can be avoided completely in the quantization of the current frame, by taking into account only the unquantized impulse response from the previous frame and the quantized impulse response into the next frame. This improves robustness of systems where packet-loss is expected.

Figure 2:
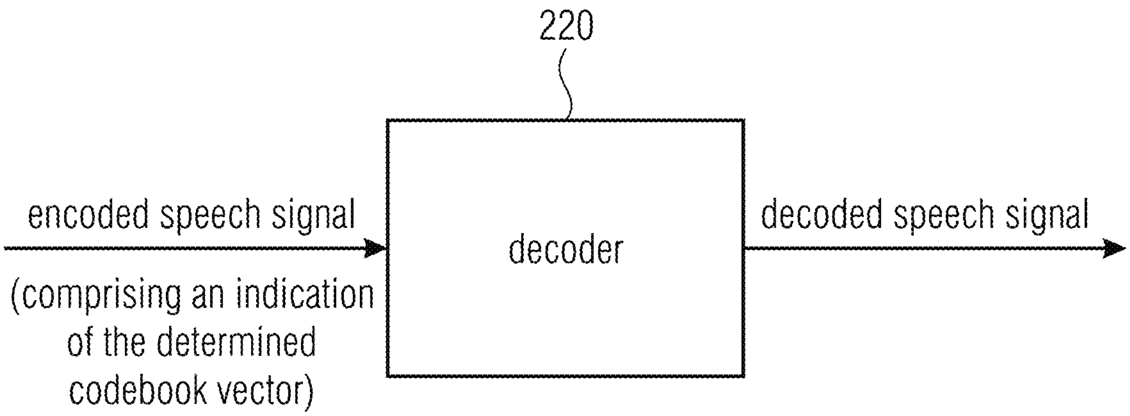
FIG. 2 illustrates a decoder according to an embodiment and a decoder.

FIG. 2 illustrates a decoder 220 for decoding an encoded speech signal being encoded by an apparatus according to the above-described embodiment to obtain a decoded speech signal. The decoder 220 is configured to receive the encoded speech signal, wherein the encoded speech signal comprises the an indication of the codebook vector, being determined by an apparatus for encoding a speech signal according to one of the above-described embodiments, for example, an index of the determined codebook vector. Furthermore, the decoder 220 is configured to decode the encoded speech signal to obtain a decoded speech signal depending on the codebook vector.

Figure 3:
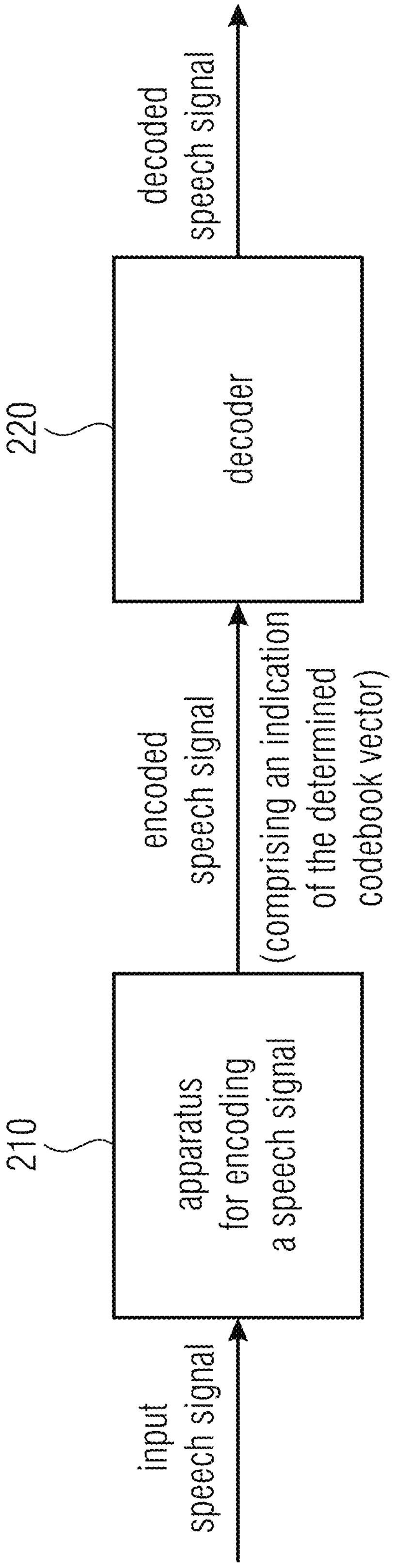
FIG. 3 illustrates a system comprising an apparatus for encoding a speech signal according to an embodiment and a decoder.

FIG. 3 illustrates a system according to an embodiment. The system comprises an apparatus 210 according to one of the above-described embodiments for encoding an input speech signal to obtain an encoded speech signal. The encoded speech signal comprises an indication of the determined codebook vector determined by the apparatus 210 for encoding a speech signal, e.g., it comprises an index of the codebook vector. Moreover, the system comprises a decoder 220 according to the above-described embodiment for decoding the encoded speech signal to obtain a decoded speech signal. The decoder 220 is configured to receive the encoded speech signal. Moreover, the decoder 220 is configured to decode the encoded speech signal to obtain a decoded speech signal depending on the determined codebook vector.

Although some aspects have been described in the context of an apparatus, these aspects also represent a description of the corresponding method, where a block or device corresponds to a method step or a feature of a method step. Analogously, aspects described in the context of a method step also represent a description of a corresponding block or item or feature of a corresponding apparatus.

The inventive decomposed signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

Embodiments of the invention comprise an apparatus for encoding a speech signal by determining a codebook vector of a speech coding algorithm, wherein the apparatus comprises a matrix determiner for determining an autocorrelation matrix R, and a codebook vector determiner for determining the codebook vector depending on the autocorrelation matrix R, wherein the matrix determiner is configured to determine the autocorrelation matrix R by determining vector coefficients of a vector r, wherein the autocorrelation matrix R comprises a plurality of rows and a plurality of columns, wherein the vector r indicates one of the columns or one of the rows of the autocorrelation matrix R, wherein R{i, j)=*\i−j\\ wherein R(i, j) indicates the coefficients of the autocorrelation matrix R, wherein i is a first index indicating one of a plurality of rows of the autocorrelation matrix R, and wherein j is a second index indicating one of the plurality of columns of the autocorrelation matrix R.

Embodiments of the invention further comprise the apparatus of the immediately preceding embodiment, wherein the matrix determiner is configured to determine the vector coefficients of the vector r by applying the formula:

$$r(k) = h(k) * h(-k) = \sum h(l)h(l-k)$$

wherein h(k) indicates a perceptually weighted impulse response of a linear predictive model, and wherein k is an index being an integer, and wherein/is an index being an integer.

Embodiments of the invention further comprise the apparatus of the two immediately preceding embodiments wherein the matrix determiner is configured to determine the autocorrelation matrix R depending on a perceptually weighted linear predictor.

Embodiments of the invention further comprise the apparatus of any of the immediately preceding embodiments, wherein the codebook vector determiner (120) is configured to determine the codebook vector by applying the formula $$\frac{(d^T \hat{e})^2}{\hat{e}^T R \hat{e}}$$

wherein R is the autocorrelation matrix, and wherein e is one of the codebook vectors of the speech coding algorithm, and wherein is a normalized/(e) correlation.

Embodiments of the invention further comprise the apparatus of the immediately preceding embodiment, wherein the codebook vector determiner is configured to determine that codebook vector e of the speech coding algorithm which maximizes the normalized correlation e Re.

Embodiments of the invention further comprise the apparatus of any of the immediately preceding embodiments, wherein the codebook vector determiner is configured to decompose the autocorrelation matrix R by conducting a matrix decomposition.

Embodiments of the invention further comprise the apparatus of the immediately preceding embodiment, wherein the codebook vector determiner is configured to conduct the matrix decomposition to determine a diagonal matrix D for determining the codebook vector.

Embodiments of the invention further comprise the apparatus of the immediately preceding embodiment, wherein the codebook vector determiner is configured to determine the codebook vector by employing $$\frac{(f^H D \hat{f})^2}{\hat{f}^H D \hat{f}},$$

wherein D is the diagonal matrix, wherein f is a first vector, and wherein/is a second vector.

Embodiments of the invention further comprise the apparatus of either of the two immediately preceding embodiments, wherein the codebook vector determiner is configured to conduct a Vandermonde factorization on the autocorrelation matrix R to decompose the autocorrelation matrix R to conduct the matrix decomposition to determine the diagonal matrix D for determining the codebook vector.

Embodiments of the invention further comprise the apparatus of any of the three immediately preceding embodiments, wherein the codebook vector determiner is configured to employ the equation Cx\\$^2$=\\DVx to determine the codebook vector, wherein C indicates a convolution matrix, wherein Vindicates a Fourier transform, and wherein x indicates the speech signal.

Embodiments of the invention further comprise the apparatus of any of the four immediately preceding embodiments, wherein the codebook vector determiner is configured to conduct a singular value decomposition on the autocorrelation matrix R to decompose the autocorrelation matrix R to conduct the matrix decomposition to determine the diagonal matrix D for determining the codebook vector.

Embodiments of the invention further comprise an apparatus according to any of the four embodiments preceding the immediately preceding embodiment, wherein the codebook vector determiner is configured to conduct a Cholesky decomposition on the autocorrelation matrix R to decompose the autocorrelation matrix R to conduct the matrix decomposition to determine the diagonal matrix D for determining the codebook vector.

Embodiments of the invention further comprise the apparatus of any of the preceding embodiments, wherein the codebook vector determiner is configured to determine the codebook vector depending on a zero impulse response of the speech signal.

Embodiments of the invention further comprise the apparatus of any of the preceding embodiments, wherein the apparatus is an encoder for encoding the speech signal by employing algebraic code excited linear prediction speech coding, and wherein the codebook vector determiner is configured to determine the codebook vector based on the autocorrelation matrix R as a codebook vector of an algebraic codebook.

Embodiments of the invention further comprise a method for encoding a speech signal by determining a codebook vector of a speech coding algorithm, wherein the method comprises: determining an autocorrelation matrix R, and determining the codebook vector depending on the autocorrelation matrix R, wherein determining an autocorrelation matrix R comprises determining vector coefficients of a vector r, wherein the autocorrelation matrix R comprises a plurality of rows and a plurality of columns, wherein the vector r indicates one of the columns or one of the rows of the autocorrelation matrix R, wherein R(i, j)=r(\i–j\), wherein R(i, j) indicates the coefficients of the autocorrelation matrix R, wherein i is a first index indicating one of a plurality of rows of the autocorrelation matrix R, and wherein j is a second index indicating one of the plurality of columns of the autocorrelation matrix R.

Embodiments of the invention further comprise a decoder for decoding an encoded speech signal being encoded by an apparatus according to the first of the preceding embodiments to obtain a decoded speech signal.

Embodiments of the invention further comprise a method for decoding an encoded speech signal being encoded according to the method of the embodiment preceding the immediately preceding embodiment to obtain a decoded speech signal.

Embodiments of the invention further comprise a system comprising an apparatus according to any of the first fourteen preceding embodiments for encoding an input speech signal to obtain an encoded speech signal, and a decoder according to the immediately preceding embodiment for decoding the encoded speech signal to obtain a decoded speech signal.

Embodiments of the invention further comprise a method comprising encoding an input speech signal according to the method of the embodiment preceding the three immediately preceding embodiments to obtain an encoded speech signal, and decoding the encoded speech signal according to the method of the embodiment preceding the immediately preceding embodiment to obtain a decoded speech signal.

Embodiments of the invention further comprise a computer program for implementing the method of any of the embodiment preceding the four immediately preceding embodiments, the embodiments preceding the two immediately preceding embodiments, and the embodiment immediately preceding this embodiment, when being executed on a computer or signal processor.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] Salami, R. and Laflamme, C. and Bessette, B. and Adoul, J. P., "ITU-T G. 729 Annex A: reduced complexity 8 kb/s CS-ACELP codec for digital simultaneous voice and data", Communications Magazine, IEEE, vol 35, no 9, pp 56-63, 1997.

[2] 3GPP TS 26.190 V7.0.0, "Adaptive Multi-Rate (AMR-WB) speech codec", 2007.

[3] ITU-T G.718, "Frame error robust narrow-band and wideband embedded variable bit-rate coding of speech and audio from 8-32 kbit/s", 2008.

[4] Schroeder, M. and Atal, B., "Code-excited linear prediction (CELP): High-quality speech at very low bit rates", Acoustics, Speech, and Signal Processing, IEEE Int Conf, pp 937-940, 1985.

[5] Byun, K. J. and Jung, H. B. and Hahn, M. and Kim, K. S., "A fast ACELP codebook search method", Signal Processing, 2002 6th International Conference on, vol 1, pp 422-425, 2002.

[6] G. H. Golub and C. F. van Loan, "Matrix Computations", 3rd Edition, John Hopkins University Press, 1996.

[7] Boley, D. L. and Luk, F. T. and Vandevoorde, D., "Vandermonde factorization of a Hankel matrix", Scientific computing, pp 27-39, 1997.

[8] Bäckström, T. and Magi, C., "Properties of line spectrum pair polynomials—A review", Signal processing, vol. 86, no. 11, pp. 3286-3298, 2006.

[9] A. Härmä, M. Karjalainen, L. Savioja, V. Välimäki, U. Laine, and J. Huopaniemi, "Frequencywarped signal processing for audio applications," J. Audio Eng. Soc, vol. 48, no. 11, pp. 1011-1031, 2000.

[10] T. Laakso, V. Välimäki, M. Karjalainen, and U. Laine, "Splitting the unit delay [FIR/all pass filters design]," IEEE Signal Process. Mag.,vol. 13, no. 1, pp. 30-60, 1996.

[11] J. Smith III and J. Abel, "Bark and ERB bilinear transforms," IEEE Trans. Speech Audio Process., vol. 7, no. 6, pp. 697-708, 1999.

[12] R. Schappelle, "The inverse of the confluent Vandermonde matrix," IEEE Trans. Autom. Control, vol. 17, no. 5, pp. 724-725, 1972.

[13] B. Bessette, R. Salami, R. Lefebvre, M. Jelinek, J. Rotola-Pukkila, J. Vainio, H. Mikkola, and K. Jarvinen, "The adaptive multirate wideband speech codec (AMR-WB)," Speech and Audio Processing, IEEE Transactions on, vol. 10, no. 8, pp. 620-636, 2002.

[14] M. Bosi and R. E. Goldberg, Introduction to Digital Audio Coding and Standards. Dordrecht, The Netherlands: Kluwer Academic Publishers, 2003.

[15] B. Edler, S. Disch, S. Bayer, G. Fuchs, and R. Geiger, "A time-warped MDCT approach to speech transform coding," in Proc 126th AES Convention, Munich, Germany, May 2009.

[16] J. Makhoul, "Linear prediction: A tutorial review," Proc. IEEE, vol. 63, no. 4, pp. 561-580, April 1975.

[17] J.-P. Adoul, P. Mabilleau, M. Delprat, and S. Morissette, "Fast CELP coding based on algebraic codes," in Acoustics, Speech, and Signal Processing, IEEE Int Conf (ICASSP'87), April 1987, pp. 1957-1960.

[18] ISO/IEC 23003-3:2012, "MPEG-D (MPEG audio technologies), Part 3: Unified speech and audio coding," 2012.

[19] F.-K. Chen and J.-F. Yang, "Maximum-take-precedence ACELP: a low complexity search method," in Acoustics, Speech, and Signal Processing, 2001. Proceedings. (ICASSP'01). 2001 IEEE International Conference on, vol. 2. IEEE, 2001, pp. 693-696.

[20] R. P. Kumar, "High computational performance in code exited linear prediction speech model using faster codebook search techniques," in Proceedings of the International Conference on Computing: Theory and Applications. IEEE Computer Society, 2007, pp. 458-462.

[21] N. K. Ha, "A fast search method of algebraic codebook by reordering search sequence," in Acoustics, Speech, and Signal Processing, 1999. Proceedings., 1999 IEEE International Conference on, vol. 1. IEEE, 1999, pp. 21-24.

[22] M. A. Ramirez and M. Gerken, "Efficient algebraic multipulse search," in Telecommunications Symposium, 1998. ITS'98 Proceedings. SBT/IEEE International. IEEE, 1998, pp. 231-236.

[23] ITU-T Recommendation G.191, "Software tool library 2009 user's manual," 2009.

[24] ITU-T Recommendation P.863, "Perceptual objective listening quality assessment," 2011.

[25] T. Thiede, W. Treurniet, R. Bitto, C. Schmidmer, T. Sporer, J. Beerends, C. Colomes, M. Keyhl, G. Stoll, K. Brandeburg et al., "PEAQ—the ITU standard for objective measurement of perceived audio quality," Journal of the Audio Engineering Society, vol. 48, 2012.

[26] ITU-R Recommendation BS.1534-1, "Method for the subjective assessment of intermediate quality level of coding systems," 2003.

The invention claimed is:

1. An apparatus for encoding an audio signal by determining a codebook vector of an audio coding algorithm, wherein the apparatus comprises:

wherein the apparatus is configured for determining an autocorrelation matrix R, and wherein the apparatus is configured for determining the codebook vector depending on the autocorrelation matrix R, wherein the apparatus is configured to acquire an encoded audio signal using the codebook vector, wherein the apparatus is configured to determine the autocorrelation matrix R by determining vector coefficients of a vector r, wherein $$R(i, j) = r(|i - j|),$$

wherein R(i, j) indicates the coefficients of the autocorrelation matrix R, wherein i indicates a first index, wherein j indicates a second index, wherein the apparatus is configured to determine a codebook vector ê of the audio coding algorithm which maximizes the normalized correlation $$f(\hat{e}) = \frac{(e^T R \hat{e})^2}{\hat{e}^T R \hat{e}}$$

wherein R is the autocorrelation matrix, wherein R is a Hermitian Toeplitz matrix, and wherein ê is one of the codebook vectors of the audio coding algorithm, and wherein e is an original, unquantized residual signal, wherein superscript T denotes transpose.

2. The apparatus according to claim 1, wherein the apparatus is configured to determine the vector coefficients of the vector r by applying the formula:

$$r(k) = h(k) * h(-k) = \sum_l h(l)h(l - k)$$

wherein h(k) indicates a perceptually weighted impulse response of a linear predictive model, and wherein k is an index being an integer, and wherein l is an index being an integer.

3. The apparatus according to claim 1, wherein the apparatus is configured to determine the autocorrelation matrix R depending on a perceptually weighted linear predictor.

4. The apparatus according to claim 1, wherein the apparatus is configured to decompose the autocorrelation matrix R by conducting a matrix decomposition.

5. The apparatus according to claim 4, wherein the apparatus is configured to conduct the matrix decomposition to determine a diagonal matrix D for determining the codebook vector.

6. The apparatus according to claim 5, wherein the codebook vector determiner is configured to determine the codebook vector by employing $$\frac{(f^H D \hat{f})^2}{\hat{f}^H D \hat{f}},$$

wherein D is the diagonal matrix, wherein f is a first vector, and wherein $\hat{f}$ is a second vector, and wherein H indicates a Hermitian transpose of a vector.

7. The apparatus according to claim 5, wherein the apparatus is configured to conduct a Vandermonde factorization on the autocorrelation matrix R to decompose the autocorrelation matrix R to conduct the matrix decomposition to determine the diagonal matrix D for determining the codebook vector.

8. The apparatus according to claim 5, wherein the apparatus is configured to employ the equation $$\|Cx\|^2 = \|DVx\|^2$$

to determine the codebook vector, wherein C indicates a convolution matrix, wherein Vindicates a Fourier transform, and wherein x indicates the audio signal.

9. The apparatus according to claim 5, wherein the apparatus is configured to conduct a singular value decomposition on the autocorrelation matrix R to decompose the autocorrelation matrix R to conduct the matrix decomposition to determine the diagonal matrix D for determining the codebook vector.

10. The apparatus according to claim 5, wherein the apparatus is configured to conduct a Cholesky decomposition on the autocorrelation matrix R to decompose the autocorrelation matrix R to conduct the matrix decomposition to determine the diagonal matrix D for determining the codebook vector.

11. The apparatus according to claim 1, wherein the apparatus is configured to determine the codebook vector depending on a zero impulse response of the audio signal.

12. The apparatus according to claim 1, wherein the apparatus is an encoder for encoding the audio signal by employing algebraic code excited linear prediction audio coding, and wherein the apparatus is configured to determine the codebook vector based on the autocorrelation matrix R as a codebook vector of an algebraic codebook.

13. A method for encoding an audio signal by determining a codebook vector of an audio coding algorithm, wherein the method comprises:

determining an autocorrelation matrix R, and determining the codebook vector depending on the autocorrelation matrix R, acquiring an encoded audio signal using the codebook vector, wherein determining an autocorrelation matrix R comprises determining vector coefficients of a vector r, wherein $$R(i, j) = r(|i - j|),$$

wherein R(i, j) indicates the coefficients of the autocorrelation matrix R, wherein i indicates a first index, wherein j indicates a second index, wherein the method comprises determining a codebook vector ê of the audio coding algorithm which maximizes the normalized correlation $$f(\hat{e}) = \frac{(e^T R \hat{e})^2}{\hat{e}^T R \hat{e}}$$

wherein R is the autocorrelation matrix, wherein R is a Hermitian Toeplitz matrix, and wherein ê is one of the codebook vectors of the audio coding algorithm, and wherein e is an original, unquantized residual signal, wherein superscript T denotes transpose.

14. A decoder for decoding an encoded audio signal being encoded by an apparatus for encoding an audio signal by determining a codebook vector of an audio coding algorithm, wherein the decoder is configured for determining an autocorrelation matrix R, and wherein the decoder is configured for determining the codebook vector depending on the autocorrelation matrix R, wherein the decoder is configured to acquire a decoded audio signal using the codebook vector, wherein the decoder is configured to determine the autocorrelation matrix R by determining vector coefficients of a vector r, wherein $$R(i, j) = r(|i-j|),$$

wherein R(i, j) indicates the coefficients of the autocorrelation matrix R, wherein i indicates a first index, wherein j indicates a second index, wherein the codebook vector is a codebook vector ẽ of the audio coding algorithm which maximizes the normalized correlation $$f(\hat{e}) = \frac{(e^T R\hat{e})^2}{\hat{e}^T R\hat{e}}$$

wherein R is the autocorrelation matrix, wherein R is a Hermitian Toeplitz matrix, and wherein ẽ is one of the codebook vectors of the audio coding algorithm, and wherein e is an original, unquantized residual signal, wherein superscript T denotes transpose.

15. A method for decoding an encoded audio signal being encoded according to the method for encoding an audio signal by determining a codebook vector of an audio coding algorithm, wherein the method for encoding comprises:

determining an autocorrelation matrix R, and determining the codebook vector depending on the autocorrelation matrix R, acquiring a decoded audio signal using the codebook vector, wherein determining an autocorrelation matrix R comprises determining vector coefficients of a vector r, wherein $$R(i, j) = r(|i-j|),$$

wherein R(i, j) indicates the coefficients of the autocorrelation matrix R, wherein i indicates a first index, wherein j indicates a second index, wherein the codebook vector is a codebook vector ê of the audio coding algorithm which maximizes the normalized correlation $$f(\hat{e}) = \frac{(e^T R\hat{e})^2}{\hat{e}^T R\hat{e}}$$

wherein R is the autocorrelation matrix, wherein R is a Hermitian Toeplitz matrix, and wherein ê is one of the codebook vectors of the audio coding algorithm, and wherein e is an original, unquantized residual signal, wherein superscript T denotes transpose.

16. A system comprising:

an apparatus for encoding an audio signal by determining a codebook vector of an audio coding algorithm, wherein the apparatus for encoding is configured for determining an autocorrelation matrix R, and wherein the apparatus for encoding is configured for determining the codebook vector depending on the autocorrelation matrix R, wherein the apparatus for encoding is configured to determine the autocorrelation matrix R by determining vector coefficients of a vector r, wherein $$R(i, j) = r(|i-j|),$$

wherein R(i, j) indicates the coefficients of the autocorrelation matrix R, wherein i indicates a first index, wherein j indicates a second index, wherein the apparatus for encoding is configured to determine a codebook vector ê of the audio coding algorithm which maximizes the normalized correlation $$f(\hat{e}) = \frac{(e^T R\ \hat{e})^2}{\hat{e}^T R\ \hat{e}}$$

wherein R is the autocorrelation matrix, wherein R is a Hermitian Toeplitz matrix, and wherein & is one of the codebook vectors of the audio coding algorithm, and wherein e is an original, unquantized residual signal for encoding an input audio signal to acquire an encoded audio signal, and a decoder for decoding an encoded audio signal being encoded by an apparatus for encoding an audio signal by determining a codebook vector of an audio coding algorithm, wherein the decoder is configured for determining an autocorrelation matrix R, and wherein the decoder is configured for determining the codebook vector depending on the autocorrelation matrix R, wherein the decoder is configured to determine the autocorrelation matrix R by determining vector coefficients of a vector r, wherein $$R(i, j) = r(|i-j|),$$

wherein R(i, j) indicates the coefficients of the autocorrelation matrix R, wherein i indicates a first index, wherein j indicates a second index for decoding the encoded audio signal, wherein superscript T denotes transpose.

17. A method comprising:

encoding an input audio signal according to the method for encoding an audio signal by determining a codebook vector of an audio coding algorithm, wherein the method for encoding comprises:

determining an autocorrelation matrix R, and determining the codebook vector depending on the autocorrelation matrix R, wherein determining an autocorrelation matrix R comprises determining vector coefficients of a vector r, wherein $$R(i,j) = r(|i-j|),$$

wherein R(i, j) indicates the coefficients of the autocorrelation matrix R, wherein i indicates a first index, wherein j indicates a second index, wherein the method comprises determining a codebook vector ê of the audio coding algorithm which maximizes the normalized correlation $$f(\hat{e}) = \frac{(e^T R\ \hat{e})^2}{\hat{e}^T R\ \hat{e}}$$

wherein R is the autocorrelation matrix, wherein R is a Hermitian Toeplitz matrix, and wherein ê is one of the codebook vectors of the audio coding algorithm, and wherein e is an original, unquantized residual signal to acquire an encoded audio signal, and decoding the encoded audio signal according to the method for decoding an encoded audio signal being encoded according to the method for encoding an audio signal by determining a codebook vector of an audio coding algorithm, wherein the method for encoding comprises:

determining an autocorrelation matrix R, and determining the codebook vector depending on the autocorrelation matrix R, wherein determining an autocorrelation matrix R comprises determining vector coefficients of a vector r, wherein $$R(i,j) = r(|i-j|),$$

wherein R(i, j) indicates the coefficients of the autocorrelation matrix R, wherein i indicates a first index, wherein j indicates a second index wherein superscript T denotes transpose.

18. A non-transitory computer-readable medium comprising a computer program for implementing, when being executed on a computer or signal processor, the method for encoding an audio signal by determining a codebook vector of an audio coding algorithm, wherein the method comprises:

determining an autocorrelation matrix R, and determining the codebook vector depending on the autocorrelation matrix R, acquiring an encoded audio signal using the codebook vector, wherein determining an autocorrelation matrix R comprises determining vector coefficients of a vector r, wherein $$R(i,j) = r(|i-j|),$$

wherein R(i, j) indicates the coefficients of the autocorrelation matrix R, wherein i indicates a first index, wherein j indicates a second index, wherein the method comprises determining a codebook vector e of the audio coding algorithm which maximizes the normalized correlation $$f(\hat{e}) = \frac{(e^T R\ \hat{e})^2}{\hat{e}^T R\ \hat{e}}$$

wherein R is the autocorrelation matrix, wherein R is a Hermitian Toeplitz matrix, and wherein & is one of the codebook vectors of the audio coding algorithm, and wherein e is an original, unquantized residual signal, wherein superscript T denotes transpose.

19. A non-transitory computer-readable medium comprising a computer program for implementing, when being executed on a computer or signal processor, the method for decoding an encoded audio signal being encoded according to the method for encoding an audio signal by determining a codebook vector of an audio coding algorithm, wherein the method for encoding comprises:

determining an autocorrelation matrix R, and determining the codebook vector depending on the autocorrelation matrix R, acquiring a decoded audio signal using the codebook vector, wherein determining an autocorrelation matrix R comprises determining vector coefficients of a vector r, wherein $$R(i,j) = r(|i-j|),$$

wherein R(i, j) indicates the coefficients of the autocorrelation matrix R, wherein i indicates a first index, wherein j indicates a second index, wherein the codebook vector is a codebook vector ê of the audio coding algorithm which maximizes the normalized correlation $$f(\hat{e}) = \frac{(e^T R\ \hat{e})^2}{\hat{e}^T R\ \hat{e}}$$

wherein R is the autocorrelation matrix, wherein R is a Hermitian Toeplitz matrix, and wherein ê is one of the codebook vectors of the audio coding algorithm, and wherein e is an original, unquantized residual signal, wherein superscript T denotes transpose.

20. A non-transitory computer-readable medium comprising a computer program for implementing, when being executed on a computer or signal processor, the method comprising:

encoding an input audio signal according to the method for encoding an audio signal by determining a codebook vector of an audio coding algorithm, wherein the method for encoding comprises:

determining an autocorrelation matrix R, and determining the codebook vector depending on the autocorrelation matrix R, wherein determining an autocorrelation matrix R comprises determining vector coefficients of a vector r, wherein $$R(i, j) = r(|i-j|),$$

wherein R(i, j) indicates the coefficients of the autocorrelation matrix R, wherein i indicates a first index, wherein j indicates a second index, to acquire an encoded audio signal, wherein the method comprises determining a codebook vector ê of the audio coding algorithm which maximizes the normalized correlation $$f(\hat{e}) = \frac{(e^T R\ \hat{e})^2}{\hat{e}^T R\ \hat{e}}$$

wherein R is the autocorrelation matrix, wherein R is a Hermitian Toeplitz matrix, and wherein ê is one of the codebook vectors of the audio coding algorithm, and wherein e is an original, unquantized residual signal, and decoding the encoded audio signal according to the method for decoding an encoded audio signal being encoded according to the method for encoding an audio signal by determining a codebook vector of an audio coding algorithm, wherein the method for encoding comprises:

determining an autocorrelation matrix R, and determining the codebook vector depending on the autocorrelation matrix R, wherein determining an autocorrelation matrix R comprises determining vector coefficients of a vector r, wherein $$R(i, j) = r(|i-j|),$$

wherein R(i, j) indicates the coefficients of the autocorrelation matrix R, wherein i indicates a first index, wherein j indicates a second index, wherein the codebook vector is a codebook vector ê of the audio coding algorithm which maximizes the normalized correlation $$f(\hat{e}) = \frac{(e^T R\ \hat{e})^2}{\hat{e}^T R\ \hat{e}}$$

wherein R is the autocorrelation matrix, and wherein ê is one of the codebook vectors of the audio coding algorithm, and wherein e is an original, unquantized residual signal, wherein superscript T denotes transpose.

* * * * *